WADE & KAYE.

Car Wheel.

No. 1,326. Reissued July 22, 1862.

Witnesses:

W. G. Cushing

Orlando Metcalf

Inventor:

Nicholas H. Wade

Joseph Kaye

AM. PHOTO-LITHO. CO. N.Y. (OSBORNE'S PROCESS.)

UNITED STATES PATENT OFFICE.

NICHOLAS K. WADE AND JOSEPH KAYE, OF PITTSBURG, PENNSYLVANIA.

IMPROVEMENT IN METALLIC WHEELS FOR FLY-WHEELS, &c.

Specification forming part of Letters Patent No. 29,927, dated September 4, 1860; Reissue No. 1,326, dated July 22, 1862.

*To all whom it may concern:*

Be it known that we, NICHOLAS K. WADE and JOSEPH KAYE, both of Pittsburg, in the county of Allegheny and State of Pennsylvania, have invented a new and useful improvement in metallic wheels having cast rims or hubs applicable to the construction of fly-wheels, car-wheels, pulleys, &c.; and we do hereby declare that the following is a full, clear, and exact description thereof, reference being had to the annexed drawings, forming part of this specification, in which—

Figure 2:
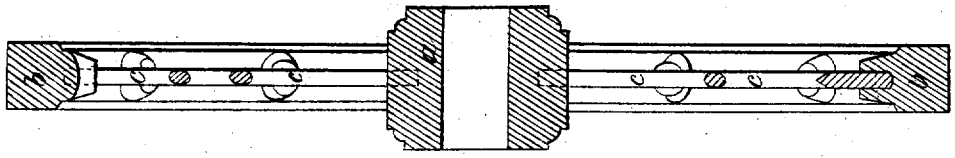
Figure 1:
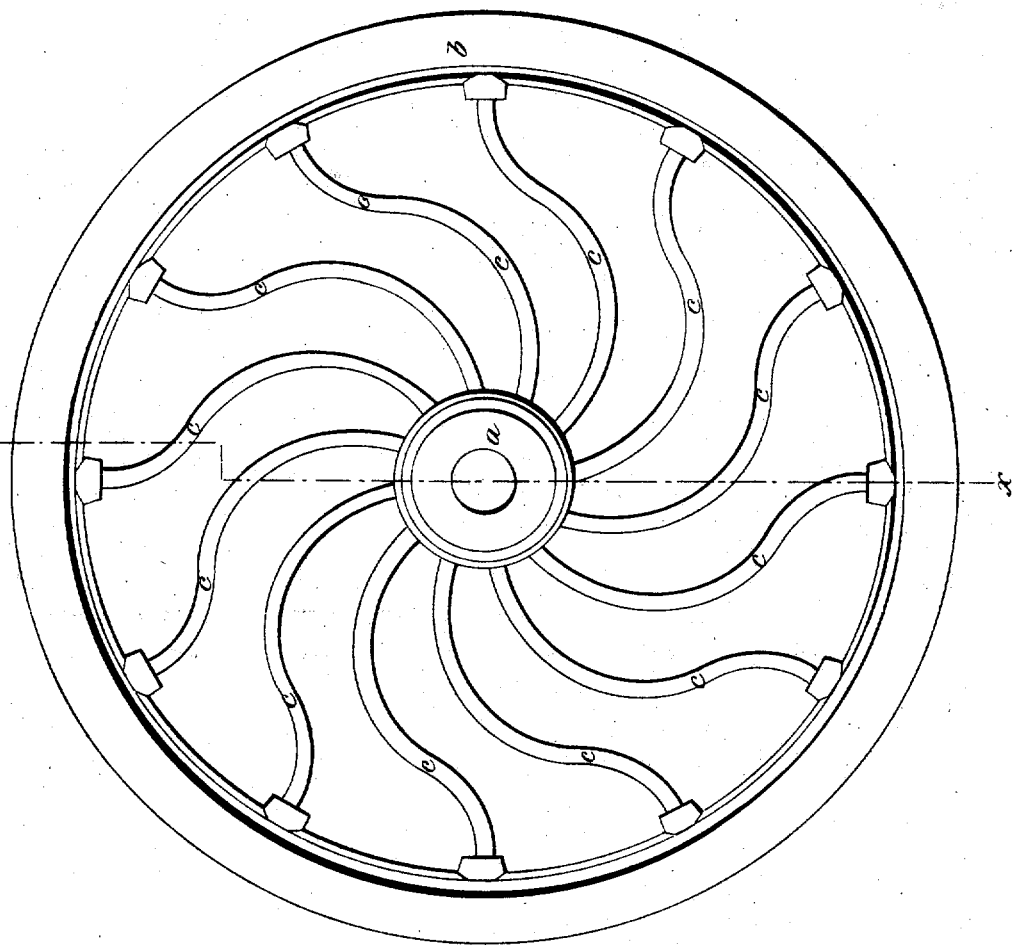

Figure 1 is a plan or representation of a fly-wheel constructed with our improvement. Fig. 2 is a transverse section of the fly-wheel shown in Fig. 1 through the line *x x*, Fig. 1.

In each of the figures like letters refer to similar parts.

Our invention is designed to apply to the construction of wheels in which either the rim or hub, or both, are made of cast metal, whether iron or other metal, and to every description of wheel, whether for the purposes of locomotion—as car-wheels—or for fly-wheels, pulleys, or the running-gear of machinery.

In the construction and use of wheels, pulleys, &c., made wholly or in part of cast metal, a serious practical difficulty arises from the contraction in cooling of the rim and hub, which renders them liable to crack either while they are being made, or, what is worse, when they are in use. This is especially the case with regard to car-wheels and fly-wheels, and is the source of very many serious accidents.

Wheels are frequently made entirely of cast-iron, both with and without spokes, but, owing to the unequal contraction of the different parts and to the cooling and consequent contraction of some parts more rapidly than the rest of the casting, there is a violent strain continually exerted on the wheel, which causes it to break very readily when in use. To remedy this evil it has been attempted to make wheels with straight wrought-iron spokes, which are set in a mold and the hub and rim cast onto them. In this case, however, the spokes serve to resist the contraction of the rim, so that when the wheel is cold the rim is very violently strained, and the hub also is exposed to a similar strain from the same cause, besides which the contraction of the cast metal tends to loosen the spokes in the rim and hub, so that wheels thus made are little, if any, better than wheels which are cast in one piece. Our invention is designed to obviate these difficulties by constructing the wheel in such a manner that the contraction of the cast metal in the rim or hub, or both, whether simultaneous or occurring at different times, shall be accommodated by the flexure of the spokes, and thus entirely doing away with all strain or tension of any part of the wheel.

In order to enable others skilled in the art to make use of our invention, we will proceed to describe it more particularly, illustrating it by describing the construction of a fly-wheel, to which kind of wheel our invention is peculiarly applicable, owing to the necessity of having the rim heavier in comparison with the other parts than in wheels designed for other purposes.

In the drawings, *a* is the hub of the wheel, and *b* is the rim. Both are made of cast-iron, although, if preferred, the hub may be of wrought-iron. The spokes *c c*, &c., are made of wrought-iron and are curved with either a single, double, or other curvature—as, for example, a waved line of three or more curvatures; but a double curvature is sufficient, and we think it preferable. This curvature of the spokes may be in the plane of the axis of the wheel, or at right angles, or at any other angle thereto. These spokes are set in the mold or flask in which the wheel is to be cast, in their proper position, with their extremities entering the cavity or matrix for the hub and rim, respectively, far enough to give the cast metal a good hold on the wrought-iron.

When the rim begins to cool, it commences to contract and continues to do so after the cast metal is so much set or hardened as to prevent its yielding to the pressure of the extremities of the wrought-iron spokes. This further contraction is compensated for by the flexion of the curved spokes. So, also, when the hub contracts in cooling the spokes will lengthen, if necessary, to compensate therefor. Thus it matters not whether the hub or rim contracts first, as the contraction causes no strain whatever on the cast-iron of the wheel, nor does it tend to loosen the spokes, as they will bend in their curvature before they will loosen in their bearings.

The result of this mode of construction of wheels is that they will not crack in making, nor are they liable to fracture in use from any undue strain or tension of the parts, as the wrought-iron spokes, while light enough to yield to the contraction of the cast metal, so fully brace each other as to be perfectly strong and reliable; and this result is entirely due to the use, in connection with a cast-iron rim or hub, or both, of curved wrought-iron or flexible spokes inserted in the hub and rim when they are cast.

This improvement is especially valuable as applied to fly wheels, in the use of which the great danger is from the liability of the rim to break and fly to pieces by centrifugal force; and also because the curved wrought-iron spokes may be made very light, thus permitting the weight of the rim to be proportionally increased, and thus adding greatly to the efficiency of the fly-wheel, as the nearer the weight is to the periphery of the wheel the greater will be its power.

Our invention is also applicable to the construction of all manner of pulleys and wheels, whether used for machinery or for the purposes of locomotion. As wheels are most usually made of iron we have spoken of cast and wrought iron in our specification, but our invention is equally applicable where the rim or hub, or both, are made of any cast metal and the spokes or arms of any suitable flexible material, curved so as to allow of its flexure in the direction of the strain caused by the contraction of the cast metal in cooling.

By means of our improvement the rim and hub of the wheel may be cast in the same flask at the same time, which is a great advantage, and which has not heretofore been successfully accomplished, owing to the hub and rim contracting unequally and not at the same time.

We are aware that straight wrought-iron spokes have been used in wheels having cast-iron rims and hubs, and that wheels have been made with curved cast-iron spokes or arms; we therefore do not claim the use of these features as new; but What we do claim as our invention, and desire to secure by Letters Patent, is—

Constructing wheels with rim and hub, or both, of metal cast on curved spokes or arms of wrought-iron or other flexible material, substantially as and for the purpose hereinbefore set forth.

In testimony whereof the said NICHOLAS K. WADE and JOSEPH KAYE have hereunto set their hands.

NICHOLAS K. WADE.
JOSEPH KAYE.

In presence of—
M. G. CUSHING,
WM. WADE, Jr.